United States Patent [19]

Palamara

[11] 4,103,925
[45] Aug. 1, 1978

[54] GUIDE MEANS FOR BOAT TRAILER

[76] Inventor: Anthony P. Palamara, 7559 Calle Granada, Anaheim, Calif. 92807

[21] Appl. No.: 709,965

[22] Filed: Jul. 30, 1976

[51] Int. Cl.² ............................................... B60P 3/10
[52] U.S. Cl. ................................. 280/414 A; 193/38
[58] Field of Search ................... 214/84, 500; 193/38, 193/41; 280/414 R

[56] References Cited

U.S. PATENT DOCUMENTS

| 3,031,093 | 4/1962 | Holsclaw | 214/505 |
| 3,204,790 | 9/1965 | Collins | 214/84 |
| 3,632,138 | 1/1972 | Whitley | 280/414 R X |
| 4,010,962 | 3/1977 | Groblebe | 214/84 X |

*Primary Examiner*—Robert G. Sheridan
*Attorney, Agent, or Firm*—Fulwider, Patton, Rieber, Lee & Utecht

[57] ABSTRACT

The disclosure is of a boat trailer, comprised of a wheeled chassis, adapted to receive and vertically support a boat. The improvement comprises two longitudinal, parallel rails mounted on opposite sides of the chassis, to guide the boat into a centered position. These rails are long enough to prevent the boat from cocking into a crosswise position on the chassis under adverse conditions of wind or waves, and also guide the boat when inaccurately steered in going onto the trailer. These rails are in the upper end portions of upwardly reaching leaf spring arms, mounted at their lowers ends on the chassis. The spring arms deflect under impact by the boat when inaccurately steered between the guide rails, and may react to bounce or throw the boat toward longitudinally aligned position. Preferably, convergent wings are used to guide the boat into the space between the longitudinal rails.

6 Claims, 3 Drawing Figures

GUIDE MEANS FOR BOAT TRAILER

BACKGROUND OF THE INVENTION

This invention relates generally to boat trailers, and more particularly to a boat trailer provided with an improved boat guide and centering system for the boat on the trailer.

When attempting to dock or steer a boat onto a trailer for the purpose of hauling, using the best facilities of which I am aware, certain difficulties are encountered.

1. The pilot of the boat must aim the boat almost exactly at and parallel to the centerline of the trailer. Skill and experience are required to do this, and the penalty for missing too much may be damage to the boat, or try after try until the boat is steered in with the necessary accuracy.

2. Boat trailers with a pair of spring mounted guide rollers on opposite sides are some improvement, but sometimes, with such a system, wind pressure can swing the boat sufficiently crosswise that the hull of the boat can be dented or a hole punched in it by a guide roller.

3. Wind and waves create adverse conditions for steering a boat accurately onto a trailer, and no prior facilities of which I am aware assure safe docking onto a boat trailer under such adverse conditions.

BRIEF DESCRIPTION OF THE INVENTION

My improved system for docking a boat onto a boat trailer employs two substantially parallel boat guide side rails mounted longitudinally on the trailer, at both front and rear, by means of substantially vertical leaf springs. The lower ends of these springs are mounted on the trailer, and the leaf springs bend laterally outwardly of the trailer to accommodate the boat when the longitudinal rails carried by their upper ends are engaged by the sides of the boat being docked. These longitudinal spring-mounted side rails prevent any material degree of crosswise swing of the boat due to wind or waves, and when engaged by the sides of the boat by reason of wind or waves, or inaccurate steering, guide and "bounce" the boat to its properly centered position. They also function to guide and sometimes bounce the boat into centered position when inaccurately steered onto the trailer. The invention also provides, optionally, but preferably, angular or out-turned spring-mounted wings just ahead of the parallel rails, or rail portions. These wings accommodate additional misalignment of the boat as it is steered onto the trailer, acting to "bounce" the entering end portion of the boat into acceptable alignment.

BRIEF DESCRIPTION OF THE DRAWINGS SHOWING PRESENT ILLUSTRATIVE EMBODIMENTS OF THE INVENTION

Figure 1:
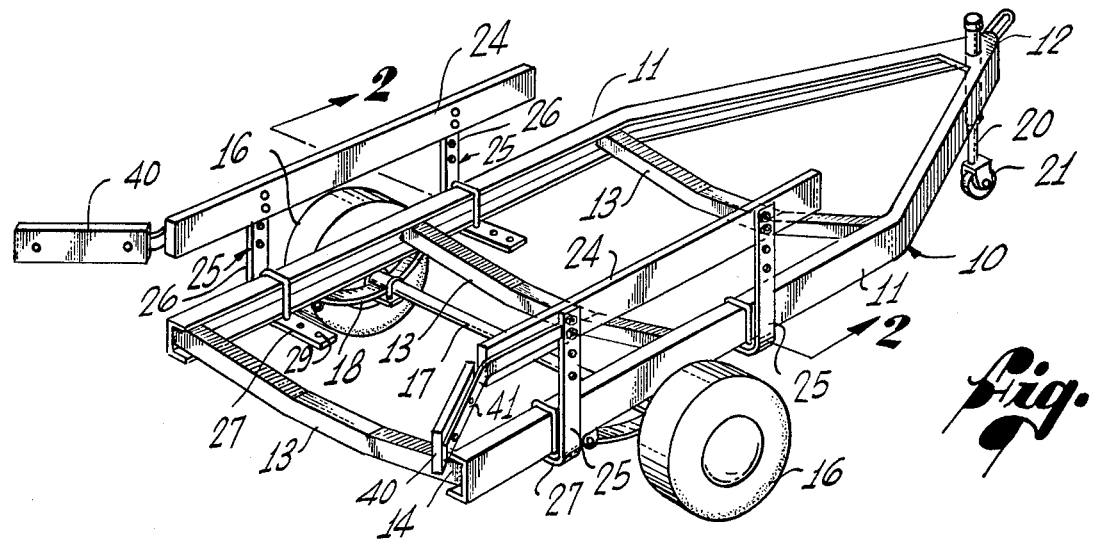
FIG. 1 is a perspective view of a boat trailer in connection with the invention.
Figure 2:
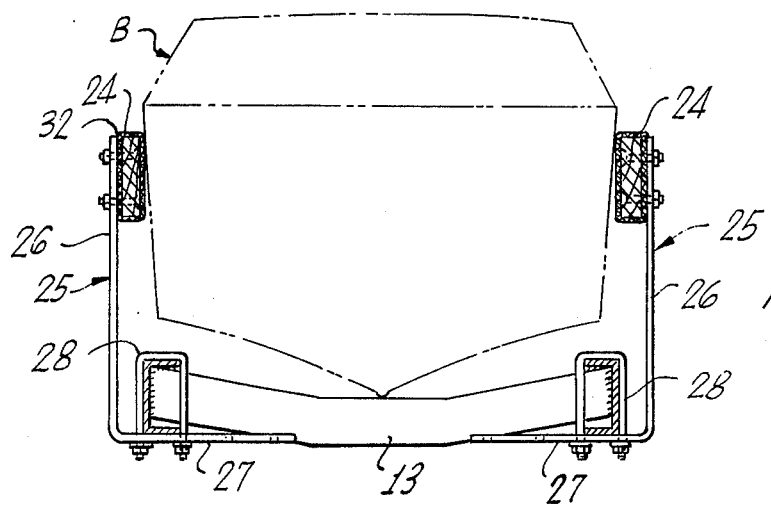
FIG. 2 is a transverse section taken on lines 2—2 of FIG. 1, showing a properly docked boat in phantom lines.

In FIGS. 1 and 2 of the drawings, numeral 10 designates generally the chassis of a boat trailer, the chassis comprising two longitudinally running channel irons 11, which are substantially parallel for most of their length, and then converge, at the front end of the trailer, to a point at 12. The two channel irons are braced by three transverse drop frame members 13, of box section, for example, which support the keel of the boat, indicated in phantom lines in FIG. 2 at B. The ends of the transverse members 13 engage in the channels, and are welded thereto, as at 14 in FIG. 1.

Two trailer wheels 16 are mounted on an axle 17, supported, in turn, through leaf springs 18, from the undersides of the longitudinal channel irons. At the "point" of the chassis is supported the vertical stem 20 of a front caster roller 21, in any conventional manner.

The parallel portions of the two channels 11 support a pair of substantially parallel longitudinal guide rails 24 by means of two longitudinally spaced upright leaf springs 25 on each side. The leaf springs 25 comprise substantially vertically extending or upright leaf spring arms 26, and inwardly bent lower end toes 27, which engage and are secured rigidly to the channels 11, either the upper or undersides thereof, in this case the latter, and which in this case are secured to the channels 11 by U-bolts 28 which go down over the channels 11, to pass through drill holes 29 in the spring toes 27. The leaf springs 25 are composed of spring steel, and are hardened and tempered. They are relatively stiff. The two guide rails 24 are fastened to the inner sides of the upper end portions of the spring arms 26. Desirable adjustability is provided by drilling the spring arms with extra holes for adjustable reception of the screws that mount the guide rails 24 on the spring arms, and the U-bolts that connect the spring toes to the channel irons, all as clearly evident in the drawings.

The guide rails can be of wood, metal, plastics, or other suitable material. They are afforded with a smooth, scratchless surface, for example, by surrounding them with a carpet casing 32 (FIG. 2), use of a plastic strip or other smooth covering, or by smooth-finishing the surfaces of the rails which engage the sides of the boat.

Optional wing members 40 are shown in FIG. 1, and will be described hereinafter.

To dock a boat floating in the water, the trailer is backed into the water sufficiently far that the boat can be driven onto or over the drop frame members 13. The boat is aimed for the longitudinal center line of the trailer, so that it can enter between the ends of the parallel guide rails 24. The front end of the boat is generally narrower than its width amidships. Generally, the entrance is easily made, thereof, and as the boat enters further, it may ride right along the center line of the trailer, until it finally engages the parallel rails on opposite sides.

The spring arms may be so adjusted that the two sides of the boat slide along the two guide rails, just in contact therewith, without bending the spring arms; or adjustments can be made such that the normal spacing distance between the rails may be less than the width of the boat amidships. In the latter case, one or the other of the rails, or both, will be deflected outwardly, the spring arms bending to a small degree of accommodate whatever misalignment may occur.

On the other hand, if the boat is not well aimed, but still not excessively off-line or off-angle, and if not too square ended, it can enter within the parallel rails 24, strike one of them, and the spring arms will then deflect and "bounce" the boat towards a better aligned and angled position, and the boat is thus guided, and turned towards properly centered and aligned position. The boat thus becomes automatically oriented to move into alignment with and straight along the longitudinal center line of the trailer, and this despite wind or waves. This is a function that cannot be carried out by a single pair of wheels or rollers, spring-mounted one on each side of the trailer.

As an optional improvement, such that the boat can be received or funneled into its properly aligned position in cases of still more initial mis-approach, or in cases of square nosed or prow boats, or tri-hull boats, convergent entrance wings 40 are mounted by means of relatively stiff leaf spring brackets 41 on the rearward end portions of the rails 24, so as, in effect, to provide rearward convergent extensions of the rails 24, adapted to receive boats that are substantially misaligned upon initial approach. The wings 40, engaged by the prow of an initially mis-aimed boat, can engage the boat and, in effect, guide it or bounce it towards alignment, the upright leaf spring arms being adapted to resiliently deflect and react, if necessary, to accomplish this function. The wings 40 may of course be carpeted or otherwise provided with a smooth face, the same as the guide rails 24. Entrance into the trailer and progress to its final carrying position is thus very greatly facilitated, notwithstanding wind, waves or inexperience of the pilot.

Figure 3:
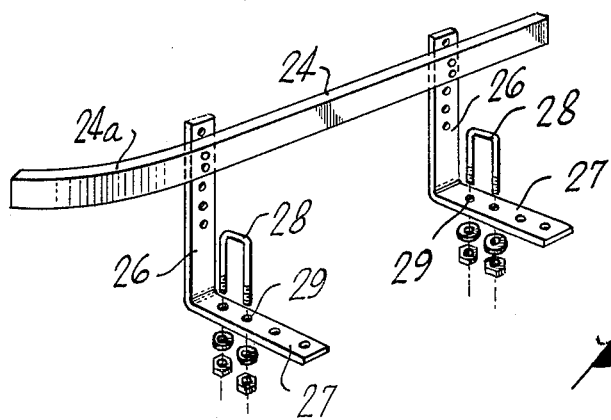
FIG. 3 is a perspective view showing a modification which is an equivalent of the form of the invention shown in FIG. 1.

In FIG. 3 is shown a modification, in which the separate wings 40 of the embodiment shown in FIG. 1 are replaced by outwardly divergent, and preferably curved, rear-end extensions 24a of the original rails 24. It will be seen that the curved extensions 24a will function in full effect as do the wings 40 of the embodiment of FIG. 1.

My invention thus provides a boat centering system which better facilitates docking of the boat onto the trailer, avoids damage to the sides of the boat, and accepts poorly aimed steering of the boat onto the trailer. Almost crosswise turning of the boat relative to the trailer, such as may occur with wind and waves, particularly with use of a pair of side-engaging spring-mounted rollers, is fully prevented.

The drawings and description are of course merely illustrative of various forms in which the guide and centering system of my invention can be fabricated, and various changes in design, structure and arrangement are to be permitted within the scope of the present invention as defined by the appended claims.

What is claimed is:

1. In a guide means for guiding a boat onto a wheeled trailer that has a boat carrying chassis including means adapted to support the hull of a boat in a longitudinally centered position thereon:

substantially parallel, horizontal side rails, one extending a substantial distance along each side of said chassis, adapted for sliding engagement by opposite sides of the hull of a boat entered longitudinally onto said chassis;

a pair of upright spring arms rigidly mounted at their lower ends on said chassis on each side thereof and being spaced a substantial distance along said side rails, the upper ends of said upright spring arms being supportingly fixed to said side rails, said upright spring arms being relatively stiff but resiliently deflectable outwardly of the chassis owing to impact by the side of a boat hull with a side rail supported thereby;

convergent auxiliary guide wings supported from said spring arms at the level of said rails and located as rearward extensions of said rails to guide a misaligned boat toward a centralized position relative to said chassis; and means for yieldably mounting said wings on the rearward portions of said rails.

2. The guide means according to claim 1, wherein said chassis comprises longitudinally extending transversely spaced frame members, connected by longitudinally spaced transverse frame members adapted to underlie and support a boat on the trailer, the pairs of upright, leaf spring arms being rigidly mounted at their lower ends on respective longitudinally extending frame members of said chassis.

3. The guide means according to claim 2, wherein said spring arms have inwardly bent toe portions engaging under said longitudinally extending frame members of said chassis.

4. The guide means according to claim 3, wherein said longitudinally extending frame members are of channel iron form, with the channels facing one another, and including U-bolts engaged downwardly over the channel formed frame member and secured thereunder to said toe portions of said spring arms.

5. The guide means according to claim 1, wherein said wings comprise outwardly curved, integral, rearward end extensions of said rails.

6. In a guide means for guiding a boat onto a wheeled trailer that has a boat carrying chassis including means adapted to support the hull of a boat in a longitudinally centered position thereon:

substantially parallel, horizontal side rails, one extending a substantial distance along each side of said chassis, adapted for sliding engagement by opposite sides of the hull of a boat entered longitudinally onto said chassis;

a pair of upright leaf spring arms rigidly mounted at their lower ends on said chassis on each side thereof and being spaced a substantial distance along said side rails, the upper ends of said upright spring arms being supportingly fixed to said side rails, said upright spring arms being relatively stiff but resiliently deflectable outwardly of the chassis owing to impact by the side of a boat hull with a side rail supported thereby;

convergent auxiliary guide wings supported from said spring arms at the level of said rails and located as rearward extensions of said rails to guide a misaligned boat toward a centralized position relative to said chassis; and relatively stiff spring brackets for mounting said wings on the rearward portions of said rails.

* * * * *